United States Patent
Momose (10) Patent No.: US 11,078,996 B2
(45) Date of Patent: Aug. 3, 2021

(54) DRIVE DEVICE AND ELECTRONIC DEVICE

(71) Applicant: Nidec Copal Corporation, Tokyo (JP)

(72) Inventor: Yosuke Momose, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/647,015

(22) PCT Filed: Sep. 14, 2018

(86) PCT No.: PCT/JP2018/034104
§ 371 (c)(1),
(2) Date: May 12, 2020

(87) PCT Pub. No.: WO2019/054467
PCT Pub. Date: Mar. 21, 2019

(65) Prior Publication Data
US 2020/0271204 A1    Aug. 27, 2020

(30) Foreign Application Priority Data

Sep. 14, 2017    (JP) ............................. JP2017-176902

(51) Int. Cl.
*F16H 25/20*      (2006.01)

(52) U.S. Cl.
CPC ..... *F16H 25/2025* (2013.01); *F16H 25/2021* (2013.01)

(58) Field of Classification Search
CPC .......................... F16H 25/2025; F16H 25/2021
See application file for complete search history.

(56) References Cited

U.S. PATENT DOCUMENTS

| | | | |
|---|---|---|---|
| 3,053,104 A | | 9/1962 | Scavini |
| 3,693,254 A | * | 9/1972 | Salonen ................. A01G 3/033 30/228 |
| 4,044,622 A | * | 8/1977 | Matthews ................ G21C 7/12 74/424.95 |
| 5,042,885 A | * | 8/1991 | Villec ................... B60T 8/4225 303/144 |

(Continued)

FOREIGN PATENT DOCUMENTS

| | | |
|---|---|---|
| JP | 2004-346707 A | 12/2004 |
| JP | 2016-15794 A | 1/2016 |

OTHER PUBLICATIONS

International Search Report in PCT/JP2018/034104, dated Dec. 11, 2018. 2pp.

*Primary Examiner* — David M Fenstermacher
(74) *Attorney, Agent, or Firm* — Hauptman Ham, LLP (57) ABSTRACT

A driver can axially rotate and axially extend and retract a driving target. A driver includes a body, a shaft including a threaded portion, a motor that rotates the shaft, and a hollow cylinder through which the shaft extends, movable in Z-direction, and restricted from rotating relative to the body, a camera module rotatably supported on the hollow cylinder and movable in Z-direction with the hollow cylinder, a coil spring that urges the hollow cylinder in the positive Z-direction, a nut screwed with the threaded portion of the shaft and movable in Z-direction while restricting movement of the hollow cylinder in Z-direction, and a clutch engageable with the nut to restrict movement of the nut in Z-direction and rotatable with the camera module.

14 Claims, 10 Drawing Sheets

(56) References Cited

U.S. PATENT DOCUMENTS

| | | | | |
|---|---|---|---|---|
| 5,778,733 | A * | 7/1998 | Stringer | F16H 25/2454 |
| | | | | 74/527 |
| 5,865,272 | A * | 2/1999 | Wiggins | F16H 25/2018 |
| | | | | 185/40 R |
| 5,983,743 | A * | 11/1999 | McGregor | F16D 27/105 |
| | | | | 251/129.13 |
| 7,159,482 | B2 * | 1/2007 | Nagai | F16H 25/2204 |
| | | | | 74/89.25 |
| 8,191,440 | B2 * | 6/2012 | Hadley | F16H 25/2454 |
| | | | | 74/89.39 |
| 8,272,285 | B2 * | 9/2012 | Kearns | B64C 25/24 |
| | | | | 74/89.37 |
| 8,794,087 | B2 * | 8/2014 | Wu | F16H 25/2015 |
| | | | | 74/89.37 |
| 9,845,853 | B2 * | 12/2017 | Chamorro Gonzalez-Tablas | |
| | | | | B64C 13/505 |
| 10,138,987 | B2 * | 11/2018 | Chen | F16H 37/041 |
| 10,458,519 | B2 * | 10/2019 | Guttenberger | F16H 1/46 |
| 2004/0261958 | A1 | 12/2004 | Sugiyama et al. | |
| 2006/0130600 | A1 * | 6/2006 | Hasegawa | F02N 15/022 |
| | | | | 74/7 C |
| 2008/0210029 | A1 * | 9/2008 | Wang | F16H 25/20 |
| | | | | 74/89.38 |
| 2015/0377323 | A1 | 12/2015 | Koike et al. | |

* cited by examiner

DRIVE DEVICE AND ELECTRONIC DEVICE

RELATED APPLICATIONS

The present application is National Phase of International Application Number PCT/JP2018/034104, filed Sep. 14, 2018, and claims priority based on Japanese Patent Application No. 2017-176902, filed Sep. 14, 2017.

FIELD

The present invention relates to a driver and an electronic device, and particularly to a driver for driving a driving target incorporated in an electronic device.

BACKGROUND

Modern electronic devices are to be smaller and also be multifunctional to provide various functions by driving components incorporated in the electronic devices. For example, a smartphone with a camera incorporates a driver that rotates the camera for imaging at various angles (refer to, for example, Patent Literature 1). Nowadays, electronic devices have more sophisticated functions, including axial extension and retraction of internal components, in addition to axial rotation of such components.

However, electronic devices that are increasingly smaller have limited space for drivers for moving components, or specifically drivers for axially rotating and axially extending and retracting components.

CITATION LIST

Patent Literature

Patent Literature 1: Japanese Unexamined Patent Application Publication No. 2016-15794

BRIEF SUMMARY

Technical Problem

In response to the above issue, one aspect of the present invention is directed to a driver that can axially rotate and axially extend and retract a driving target.

Another aspect of the present invention is directed to a small electronic device that can axially rotate and axially extend and retract a driving target incorporated in the electronic device.

Solution to Problem

A driver according to one aspect of the present invention can axially rotate and axially extend and retract a driving target. The driver includes a body, a shaft extending axially and including a threaded portion, a motor that rotates the shaft, and a hollow cylinder through which the shaft extends. The hollow cylinder is axially movable between a first axial position and a second axial position and restricted from rotating relative to the body. The driver includes a driving target rotatably supported on the hollow cylinder and axially movable with the hollow cylinder, a first urging member that urges the hollow cylinder axially toward the second axial position, a nut screwed with the threaded portion of the shaft and movable axially while restricting axial movement of the hollow cylinder between the first axial position and the second axial position, and a clutch engageable with the nut at a position opposite to the first urging member from the nut to restrict axial movement of the nut. The clutch is rotatable with the driving target.

In this structure, when the hollow cylinder is located between the first axial position and the second axial position, a feed screw mechanism including the nut and the threaded portion of the shaft driven by the motor moves the nut axially, and the urging force from the first urging member axially moves the driving target together with the hollow cylinder. The clutch then engages with the nut at the position opposite to the first urging member from the nut, restricting the feed screw mechanism from moving the nut axially. The nut thus rotates together with the shaft as driven by the motor and rotates the clutch and the driving target. In particular, the single unit can axially extend and retract and axially rotate the driving target, allowing a smaller device design.

The nut may move toward the clutch on the shaft with the hollow cylinder being at the second axial position. This structure provides a period of no movement of the driving target between the axial movement and the axial rotation to avoid sudden changes in the motion of components, thus avoiding a device breakdown.

One of the driving target or the hollow cylinder may have a first guide groove extending circumferentially, and another of the driving target or the hollow cylinder may include a first engagement portion engaged with the first guide groove. This structure includes the first engagement portion engaged with the first guide groove to axially rotate the driving target.

One of the body or the hollow cylinder may have a second guide groove extending axially, and another of the body or the hollow cylinder may include a second engagement portion engaged with the second guide groove. This structure includes the second engagement portion engaged with the second guide groove to move the hollow cylinder axially within the body.

One of the clutch or the driving target may have a third guide groove extending axially, and another of the clutch or the driving target may include a third engagement portion engaged with the third guide groove. This structure includes the third engagement portion engaged with the third guide groove to move the clutch axially relative to the driving target.

The nut may include a plurality of spring pieces elastically in contact with an inner peripheral surface of the hollow cylinder. In this structure, the spring pieces on the nut in contact with the inner peripheral surface of the hollow cylinder can restrict rotation of the nut. Thus, the spring pieces can be simply located on the nut to form the feed screw mechanism described above.

The hollow cylinder may include a fourth engagement portion protruding toward the nut, and the nut may include a fifth engagement portion engageable with the fourth engagement portion on the hollow cylinder. In this structure, the fourth engagement portion on the hollow cylinder engages with the fifth engagement portion on the nut to reliably restrict rotation of the nut and to reliably move the nut axially.

In this case, each of the fourth engagement portion on the hollow cylinder and the fifth engagement portion on the nut may have a slope to allow smooth engagement and disengagement of the nut with and from the hollow cylinder. In this structure, the slope of the fifth engagement portion on the nut hits the slope of the fourth engagement portion on the hollow cylinder as the nut rotates. The slope of the fifth engagement portion then moves axially while sliding along the slope of the fourth engagement portion. This allows the rotating nut to smoothly engage and disengage with and from the hollow cylinder.

The clutch may include a sixth engagement portion protruding toward the nut, and the nut may include a seventh engagement portion engageable with the sixth engagement portion on the clutch. In this structure, the sixth engagement portion on the clutch engages with the seventh engagement portion on the nut to reliably transmit rotation of the nut to the clutch and to reliably rotate the driving target.

In this case, each of the sixth engagement portion on the clutch and the seventh engagement portion on the nut may have a slope to allow smooth engagement and disengagement of the nut with and from the clutch. In this structure, the slope of the seventh engagement portion on the nut hits the slope of the sixth engagement portion on the clutch as the nut rotates. The slope of the seventh engagement portion then moves axially while sliding along the slope of the sixth engagement portion. This allows the rotating nut to smoothly engage and disengage with and from the clutch.

The driver may further include a second urging member that urges the clutch in a direction opposite to the direction in which the first urging member urges the hollow cylinder. The clutch may be movable axially relative to the driving target. In this case, the second urging member may be located between an end of the shaft and the clutch. In this structure, the driving target forcibly rotated in the structure having the nut engaged with the clutch moves the clutch axially relative to the nut under the urging force from the second urging member. This disengages the seventh engagement portion on the nut from the sixth engagement portion on the clutch. The clutch then rotates slightly and moves axially relative to the nut under the urging force from the second urging member, thus engaging with the nut again. The nut and the shaft thus avoid receiving a large rotational force and avoid a breakdown of the driver.

The first urging member may absorb a force axially applied on the driving target. In this structure, the first urging member can absorb any large axial force accidentally applied on the driving target in an extended state, thus reducing the impact of such a force on the driver.

A small electronic device according to another aspect of the present invention includes the driver described above. The electronic device can axially rotate and axially extend and retract the driving target incorporated in the device.

Advantageous Effects

The aspects of the present invention allow axial extension and retraction and axial rotation of a driving target to allow a smaller device design.

DETAILED DESCRIPTION

An electronic device including a driver according to one or more embodiments of the present invention will now be described in detail with reference to FIGS. 1 to 8D. In FIGS. 1 to 8D, the same or corresponding components are given the same reference numerals and will not be described repeatedly. In FIGS. 1 to 8D, the scale and dimensions of each component may be exaggerated, or one or more components may not be shown.

Figure 1:
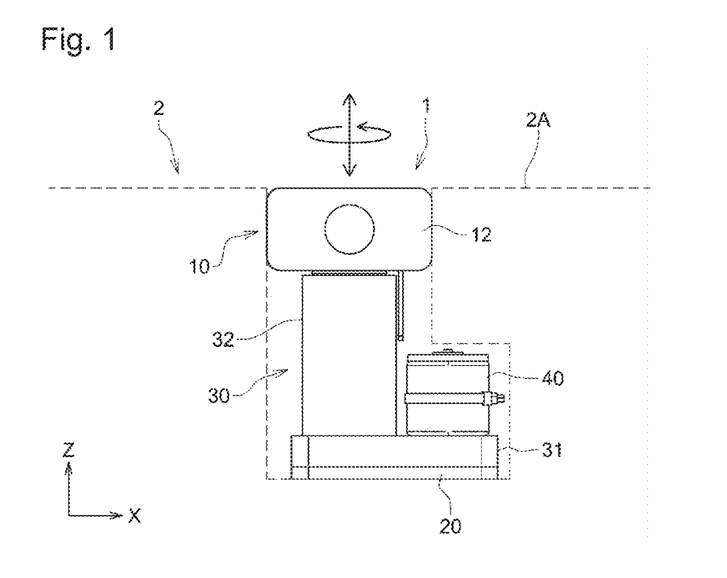
FIG. 1 is a partial schematic view of an electronic device including a driver according to one embodiment of the present invention.

FIG. 1 is a partial schematic view of an electronic device 2 including a driver 1 according to one embodiment of the present invention. The driver 1 is embedded in the electronic device 2. As indicated by the arrows in FIG. 1, the driver 1 extends a driving target 10 in the positive Z-direction from a surface 2A of the electronic device 2, rotates the extended driving target 10 about Z-axis, and retracts the driving target 10 in the negative Z-direction to be housed in the electronic device 2. For ease of explanation in the present embodiment, up or upward refers to the positive Z-direction in FIG. 1, and down or downward refers to the negative Z-direction.

The electronic device 2 may be any electronic device such as a mobile phone, a smartphone, a tablet computer, or a laptop computer. The driving target 10 drivable by the driver 1 may be any functional device such as a camera module incorporating an image sensor, a flash, or a sensor unit incorporating various sensors. In the present embodiment described below, the driver 1 includes a camera module as the driving target 10. The driver 1 may include another device as the driving target 10.

As shown in FIG. 1, the driver 1 includes a camera module 10 as a driving target, a bottom plate 20 fixed to the electronic device 2, a body 30 mounted on the bottom plate 20, and a motor 40 for driving the camera module 10. The body 30 includes a base 31 defining, together with the bottom plate 20, a space for accommodating a gear train (described later) and a cylinder 32 extending axially (in Z-direction) from the base 31. The motor 40 is, for example, a stepping motor.

Figure 2:
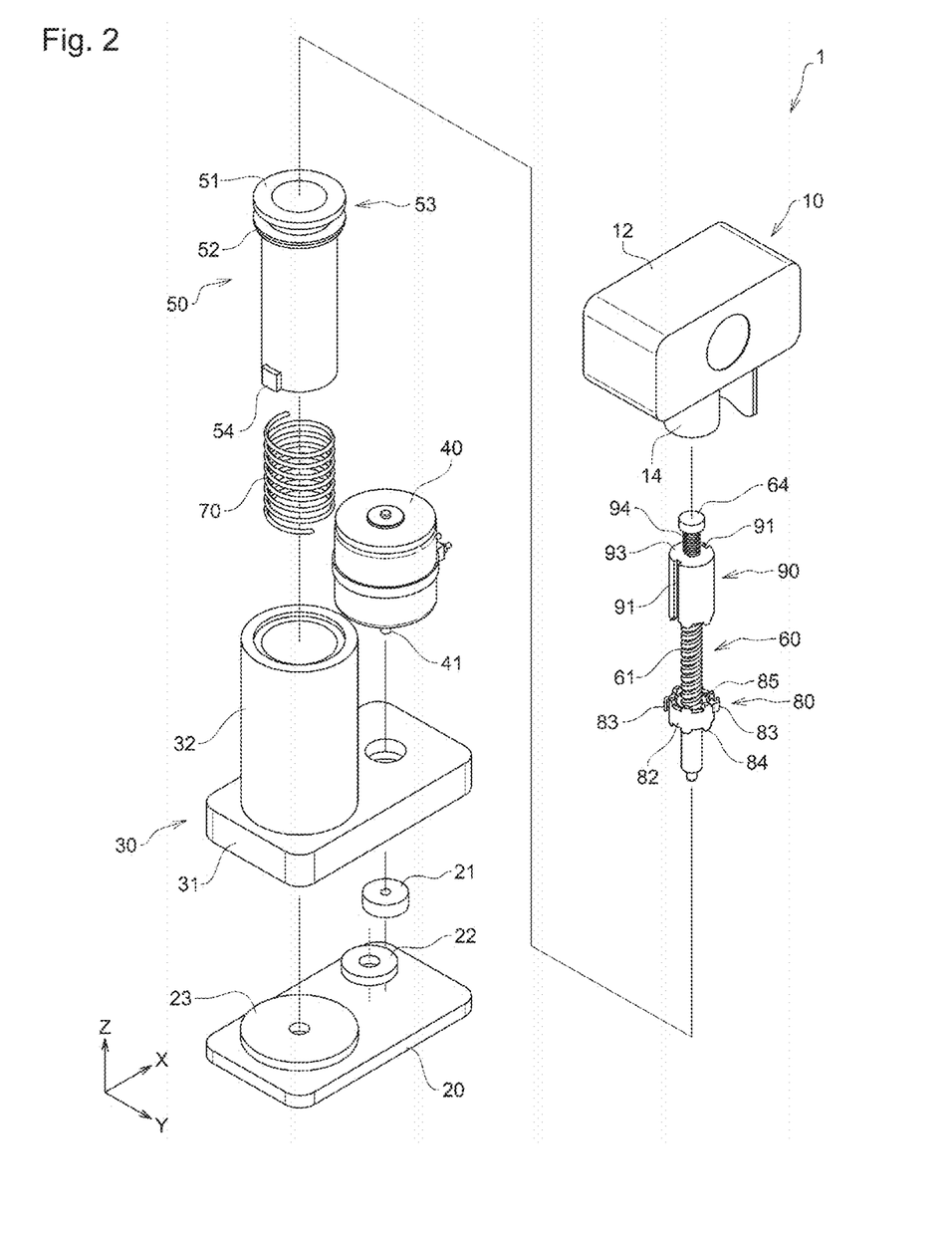
FIG. 2 is an exploded perspective view of the driver in FIG. 1.
Figure 3:
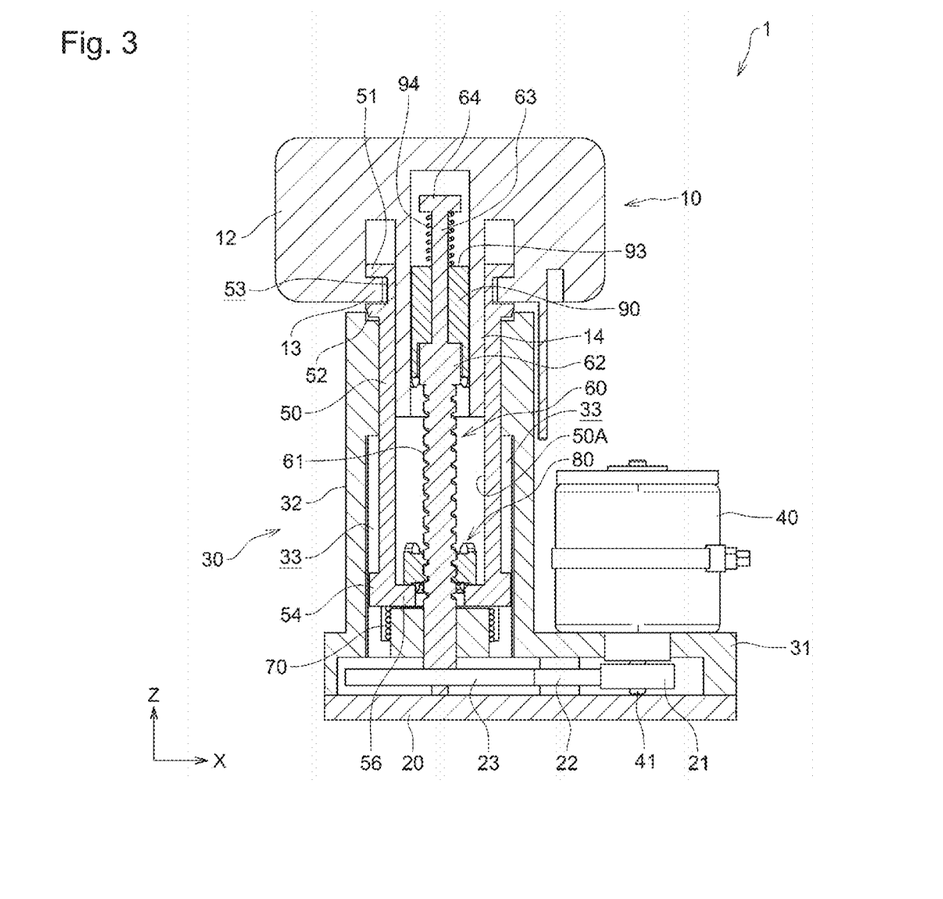
FIG. 3 is a longitudinal cross-sectional view of the driver in FIG. 1.

FIG. 2 is an exploded perspective view of the driver 1. FIG. 3 is a longitudinal cross-sectional view of the driver 1. As shown in FIGS. 2 and 3, the camera module 10 includes a rectangular body 12 and a cylindrical connector 14 extending in the negative Z-direction from the body 12. The cylinder 32 in the body 30 accommodates a hollow cylinder 50 extending in Z-direction. The upper end of the hollow cylinder 50 receives the connector 14 on the camera module 10. For simplicity, FIG. 3 shows selected components in cross section.

Figure 4:
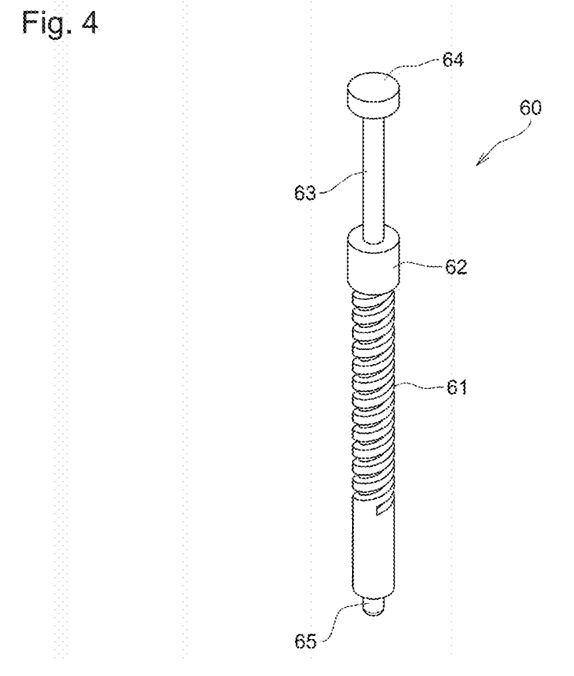
FIG. 4 is a perspective view of a shaft included in the driver in FIG. 2.

The hollow cylinder 50 receives a shaft 60 extending through it in Z-direction (axially). FIG. 4 is a perspective view of the shaft 60. As shown in FIG. 4, the shaft 60 includes a threaded portion 61 having threads on the outer periphery, a larger-diameter portion 62 having a larger diameter than the threaded portion 61 and located above the threaded portion 61, a smaller-diameter portion 63 having a smaller diameter than the threaded portion 61 and extending upward from the larger-diameter portion 62, and a disk 64 on the upper end of the smaller-diameter portion 63.

As shown in FIGS. 2 and 3, the motor 40 is mounted on the base 31 in the body 30. The motor 40 includes a rotational shaft 41 on which a gear 21 is fitted. The gear 21 meshes with a gear 22. The gear 22 meshes with a gear 23, which is fitted on the lower end 65 of the shaft 60 (refer to FIG. 4). When the motor 40 is driven, the rotational shaft 41 rotates to rotate the shaft 60 with the gears 21 to 23.

Figure 5:
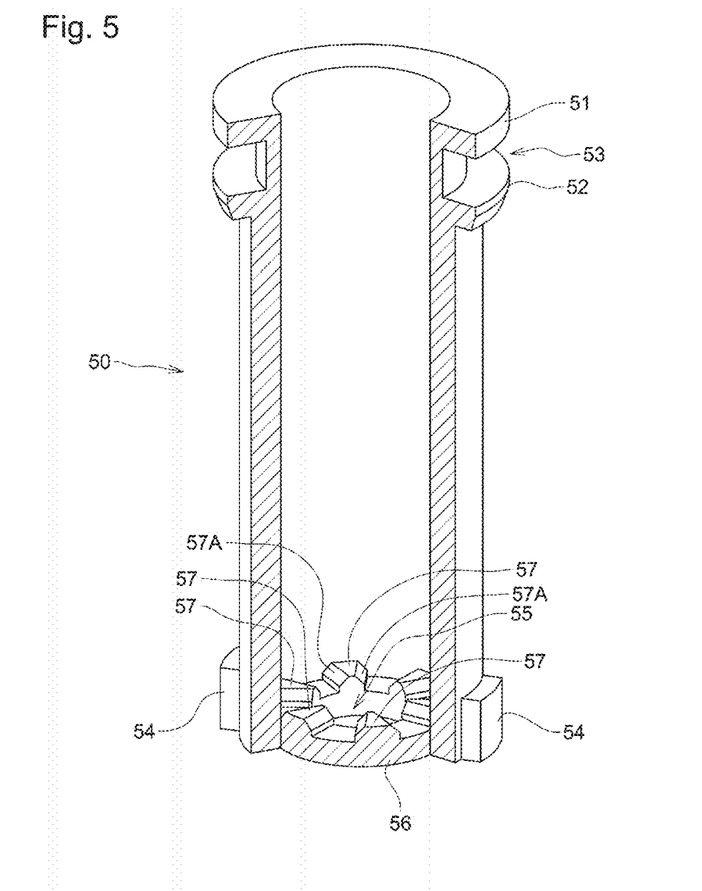
FIG. 5 is a partially broken perspective view of a hollow cylinder included in the driver in FIG. 2.

FIG. 5 is a partially broken perspective view of the hollow cylinder 50. As shown in FIG. 5, the hollow cylinder 50 has, on its upper end, two flanges 51 and 52 extending radially outward and a guide groove (first guide groove) 53 between the flanges 51 and 52. More specifically, the hollow cylinder 50 has, on its upper end, the guide groove 53 extending circumferentially. As shown in FIG. 3, the body 12 in the camera module 10 has an engagement portion (first engagement portion) 13 extending radially inward. The engagement portion 13 is engaged with the guide groove 53 on the hollow cylinder 50. The engagement portion 13 on the camera module 10 is thus guided by the guide groove 53 on the hollow cylinder 50 to rotate the camera module 10 about Z-axis.

As shown in FIG. 5, the hollow cylinder 50 has, on its lower end, a pair of protrusions (second engagement portion) 54 protruding radially outward. As shown in FIG. 3, the cylinder 32 in the body 30 has, on its inner peripheral surface, guide grooves (second guide groove) 33 extending in Z-direction. The guide grooves 33 receive the protrusions 54 on the hollow cylinder 50. The protrusions 54 on the hollow cylinder 50 are thus guided by the guide grooves 33 on the cylinder 32 to move the hollow cylinder 50 in Z-direction within the cylinder 32. The hollow cylinder 50 with the protrusions 54 engaged with the guide grooves 33 on the cylinder 32 is nonrotatable relative to the cylinder 32.

As shown in FIG. 5, the hollow cylinder 50 has, on its lower end, a bottom plate 56 with an opening 55 receiving the shaft 60. As shown in FIG. 3, a coil spring (first urging member) 70 is located between the bottom plate 56 of the hollow cylinder 50 and the bottom of the cylinder 32. In FIG. 3, the coil spring 70 is compressed, urging the hollow cylinder 50 upward.

Figure 6:
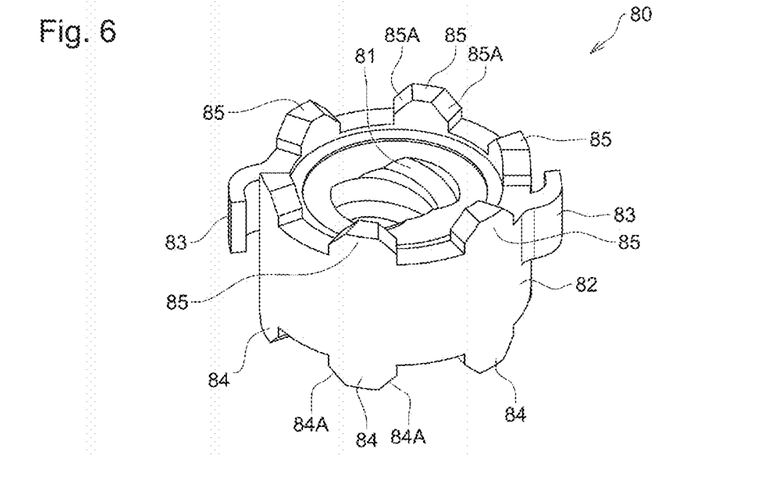
FIG. 6 is a perspective view of a nut included in the driver in FIG. 2.

The hollow cylinder 50 accommodates a nut 80 screwed with the threaded portion 61 of the shaft 60. FIG. 6 is a perspective view of the nut 80. As shown in FIG. 6, the nut 80 includes a cylinder 82 with threads 81 on the inner periphery and a pair of spring pieces 83 protruding radially outward from the cylinder 82. The spring pieces 83 are elastically in contact with the inner peripheral surface 50A (refer to FIG. 3) of the hollow cylinder 50. The spring pieces 83 in contact with the inner peripheral surface 50A of the hollow cylinder 50 restrict rotation of the nut 80. When the shaft 60 rotates as driven by the motor 40, the threaded portion 61 of the shaft 60 screwed with the threads 81 on the nut 80 forms a feed screw mechanism, moving the nut 80 axially (Z-direction). The number of spring pieces 83 and the shape of the spring pieces 83 are not limited to those as illustrated.

Figure 7:
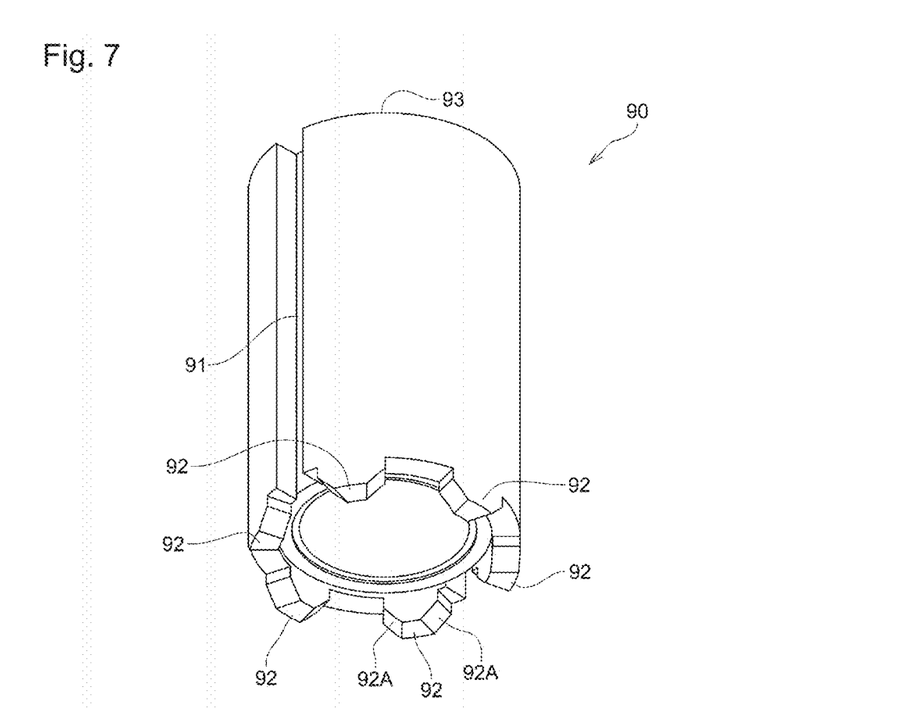
FIG. 7 is a perspective view of a clutch included in the driver in FIG. 2.

As shown in FIG. 3, a cylindrical clutch 90 is at a position opposite to the coil spring 70 from the nut 80. FIG. 7 is a perspective view of the clutch 90 as viewed from below. As shown in FIG. 7, the clutch 90 has, on its outer peripheral surface, a pair of guide grooves (third guide groove) 91 extending in Z-direction. The guide grooves 91 engage with rails (third engagement portion) 15 (refer to FIG. 8A) on the inner peripheral surface of the connector 14 on the camera module 10. The rails 15 on the camera module 10 are thus guided by the guide grooves 91 on the clutch 90 to move the clutch 90 in Z-direction relative to the camera module 10.

As shown in FIGS. 2 and 3, a coil spring (second urging member) 94 is located between the disk 64 on the upper end of the shaft 60 and the upper surface 93 of the clutch 90 and surrounds the outer periphery of the smaller-diameter portion 63 of the shaft 60. In FIG. 3, the coil spring 94 is compressed, urging the clutch 90 downward to be in contact with the larger-diameter portion 62 of the shaft 60.

As shown in FIG. 5, the bottom plate 56 of the hollow cylinder 50 has, on its outer peripheral edge, multiple bottom protrusions (fourth protrusion) 57 protruding upward toward the nut 80. The bottom protrusions 57 are arranged at predetermined intervals along the circumference. In correspondence with these, the nut 80 has multiple lower tabs (fifth engagement portion) 84 on the lower outer peripheral edge of the cylinder 82 as shown in FIG. 6. The lower tabs 84 are arranged at predetermined intervals along the circumference. The intervals between the bottom protrusions 57 on the hollow cylinder 50 are identical to the intervals between the lower tabs 84 on the nut 80, thus allowing the lower tabs 84 on the nut 80 to engage with the bottom protrusions 57 on the hollow cylinder 50.

The bottom protrusions 57 on the hollow cylinder 50 each have slopes 57A as shown in FIG. 5. The lower tabs 84 on the nut 80 each have slopes 84A as shown in FIG. 6. The slopes 57A and the slopes 84A are shaped complementarily to each other. The slopes 84A of the lower tabs 84 on the nut 80 hit the slopes 57A of the bottom protrusions 57 on the hollow cylinder 50 as the nut 80 rotates. The slopes 84A of the lower tabs 84 then move axially while sliding along the slopes 57A of the bottom protrusions 57. This allows the rotating nut 80 to smoothly engage and disengage with and from the hollow cylinder 50.

As shown in FIG. 7, the clutch 90 has, on its lower outer peripheral edge, multiple clutch protrusions (sixth engagement portion) 92 protruding downward. The clutch protrusions 92 are arranged at predetermined intervals along the circumference. In correspondence with these, the nut 80 has multiple upper tabs (seventh engagement portion) 85 on the upper outer peripheral edge of the cylinder 82 as shown in FIG. 6. The upper tabs 85 are arranged at predetermined intervals along the circumference. The intervals between the clutch protrusions 92 on the clutch 90 are identical to the intervals between the upper tabs 85 on the nut 80, thus allowing the clutch protrusions 92 on the clutch 90 to engage with the upper tabs 85 on the nut 80. The intervals between the upper tabs 85 may be identical to or different from the intervals between the lower tabs 84.

The upper tabs 85 on the nut 80 each have slopes 85A as shown in FIG. 6. The clutch protrusions 92 on the clutch 90 each have slopes 92A as shown in FIG. 7. The slopes 85A and the slopes 92A are shaped complementarily to each other. The slopes 85A of the upper tabs 85 on the nut 80 hit the slopes 92A of the clutch protrusions 92 on the clutch 90 as the nut 80 rotates. The slopes 85A of the upper tabs 85 then move axially while sliding along the slopes 92A of the clutch protrusions 92. This allows the rotating nut 80 to smoothly engage and disengage with and from the clutch 90.

The operation of the driver 1 with the above structure will now be described. FIGS. 8A to 8D are partially broken perspective views describing the operation of the driver 1 in FIG. 2. For ease of understanding, the figures show selected main components of the driver 1.

Figure 8A:
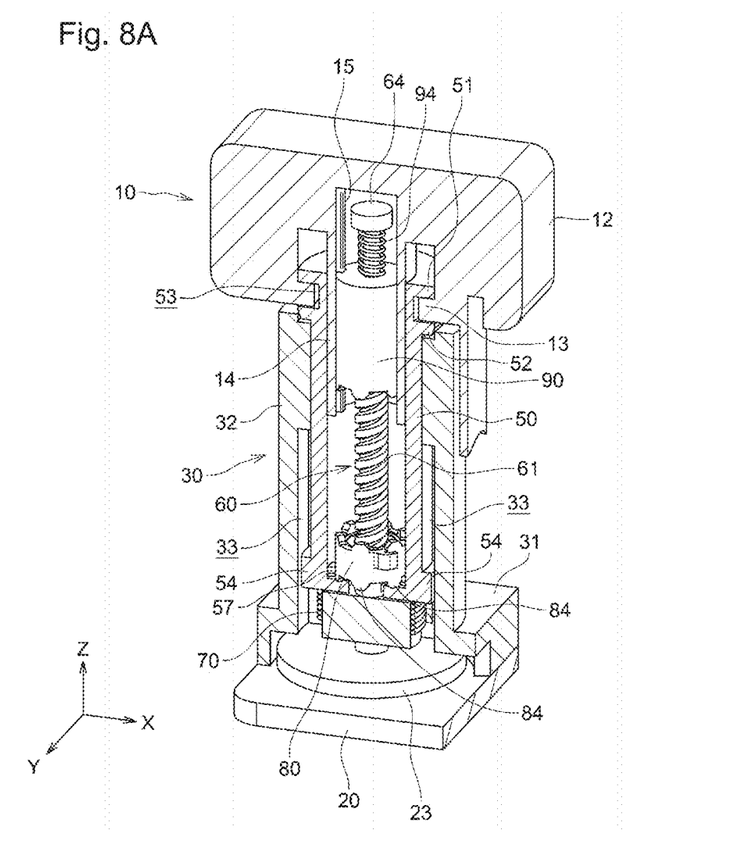
FIG. 8A is a partially broken perspective view of the driver in FIG. 2 describing its operation, with the hollow cylinder at a first axial position.

FIG. 8A shows the camera module 10 housed in the electronic device 2 (in the state shown in FIG. 1). In this state, the lower tabs 84 on the nut 80 are engaged with the bottom protrusions 57 on the hollow cylinder 50. The nut 80 and the hollow cylinder 50 are at the lowest position in the negative Z-direction (the position of the hollow cylinder 50 in this state is referred to as a first axial position). When the hollow cylinder 50 is at the first axial position, the coil spring 70 is compressed, urging the hollow cylinder 50 upward. The nut 80 screwed with the threaded portion 61 of the shaft 60 is engaged with the hollow cylinder 50, restricting the hollow cylinder 50 from moving upward with the hollow cylinder 50 being at the first axial position.

Figure 8B:
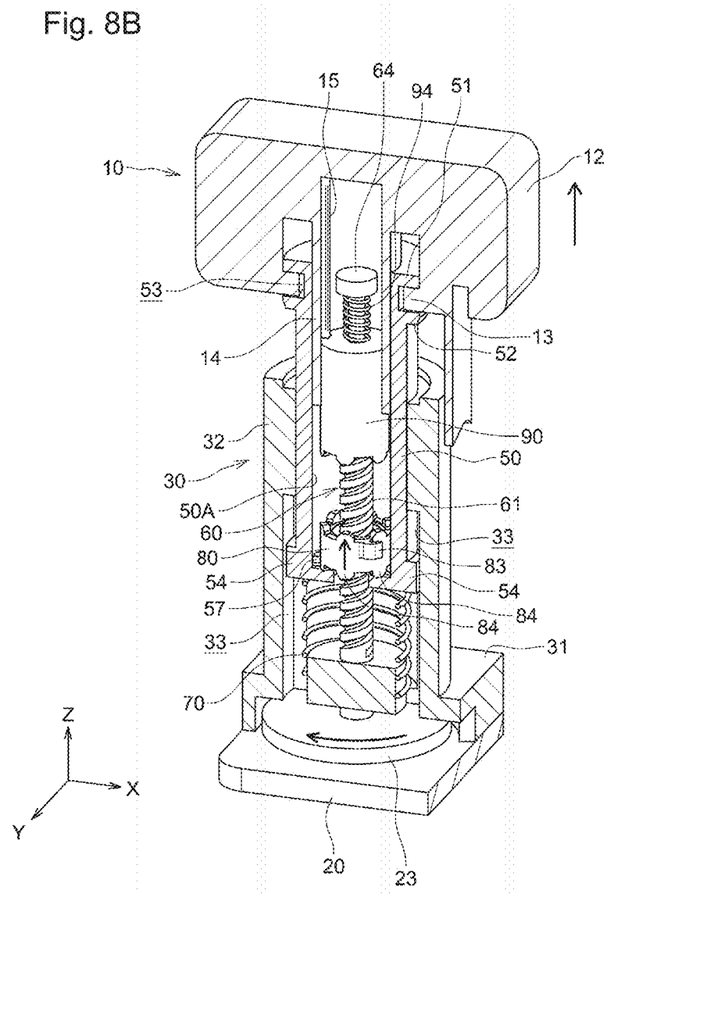
FIG. 8B is a partially broken perspective view of the driver in FIG. 2 describing its operation, with the hollow cylinder located between the first axial position and a second axial position.

When the motor 40 is driven in the state in FIG. 8A, the rotation of the rotational shaft 41 is transmitted to the shaft 60 through the gears 21 to 23 to rotate the shaft 60. In this state, having its spring pieces 83 in contact with the inner peripheral surface 50A of the hollow cylinder 50 and its lower tabs 84 engaged with the bottom protrusions 57 on the hollow cylinder 50, the nut 80 is restricted from rotating. As shown in FIG. 8B, the feed screw mechanism including the nut 80 and the threaded portion 61 of the shaft 60 moves the nut 80 upward as the shaft 60 rotates. As the nut 80 moves upward, the hollow cylinder 50 urged upward by the coil spring 70 also moves upward together with the nut 80. Having its engagement portion 13 engaged with the guide groove 53 on the hollow cylinder 50, the camera module 10 moves upward as the hollow cylinder 50 moves upward. This causes the camera module 10 to protrude from the surface 2A (refer to FIG. 1) of the electronic device 2 in Z-direction.

When the hollow cylinder 50 moves upward as described above, the protrusions 54 on the lower end of the hollow cylinder 50 hit the upper end walls of the guide grooves 33 on the cylinder 32, restricting the hollow cylinder 50 from moving further upward (the position of the hollow cylinder 50 in this state is referred to as a second axial position).

Figure 8C:
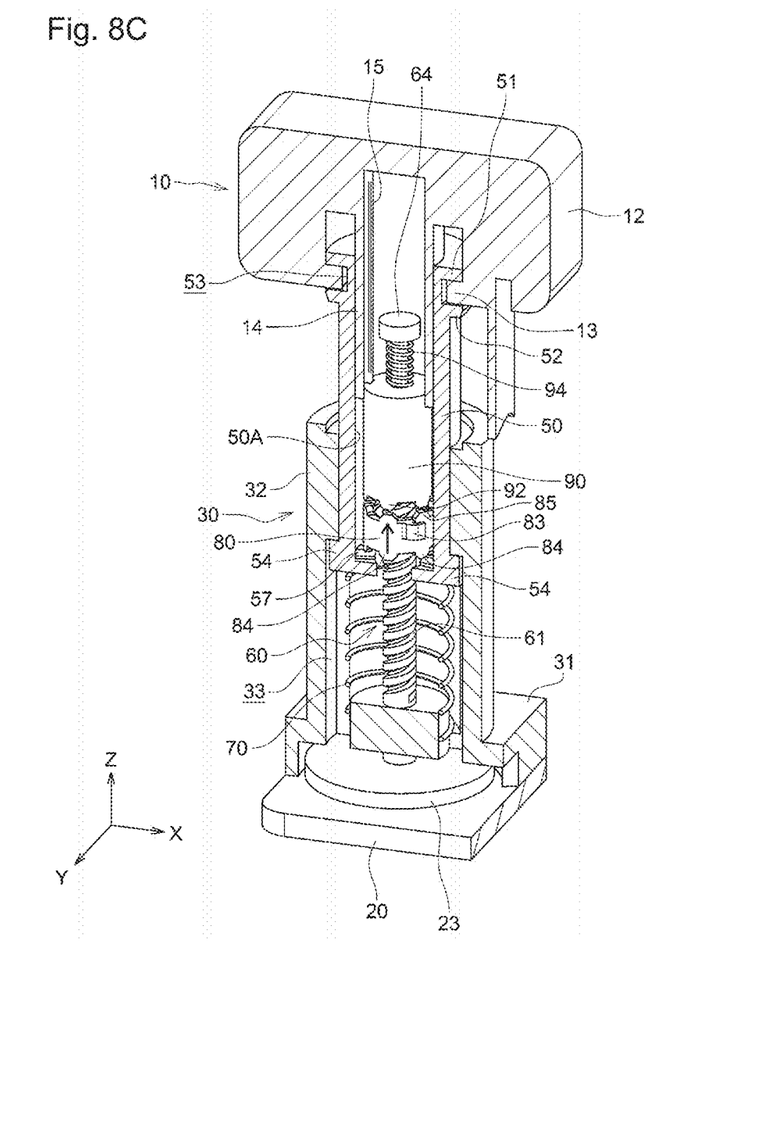
FIG. 8C is a partially broken perspective view of the driver in FIG. 2 describing its operation, with the hollow cylinder at the second axial position.

After the hollow cylinder 50 reaches the second axial position, the motor 40 is further driven to rotate the shaft 60. The spring pieces 83 on the nut 80 in contact with the inner peripheral surface 50A of the hollow cylinder 50 restrict rotation of the nut 80. As shown in FIG. 8C, the feed screw mechanism including the nut 80 and the threaded portion 61 of the shaft 60 moves the nut 80 alone upward as the shaft 60 rotates. As the nut 80 moves upward away from the bottom plate 56 of the hollow cylinder 50, the upper tabs 85 on the nut 80 engage with the clutch protrusions 92 on the lower end of the clutch 90.

After the upper tabs 85 on the nut 80 are engaged with the clutch protrusions 92 on the lower end of the clutch 90, the motor 40 is further driven to rotate the shaft 60. The urging force from the coil spring 94 located above the clutch 90 restricts upward movement of the nut 80. The force rotating the nut 80 then overcomes the friction force between the spring pieces 83 on the nut 80 and the inner peripheral surface 50A of the hollow cylinder 50, rotating the nut 80 together with the shaft 60.

Figure 8D:
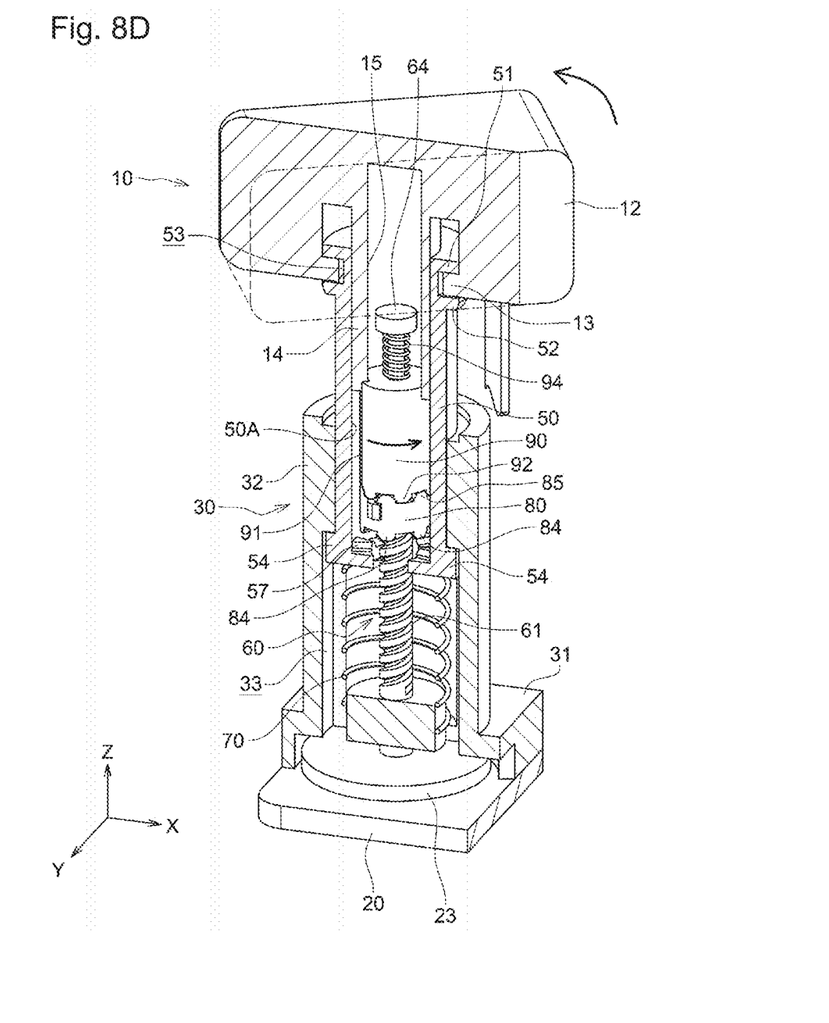
FIG. 8D is a partially broken perspective view of the driver in FIG. 2 describing its operation, with the hollow cylinder at the second axial position.

With the upper tabs 85 on the nut 80 engaged with the clutch protrusions 92 on the clutch 90, the clutch 90 rotates together with the nut 80 as shown in FIG. 8D. As described above, the rails 15 on the camera module 10 are engaged with the guide grooves 91 on the clutch 90. The camera module 10 thus rotates together with the clutch 90.

When the motor 40 is driven reversely, the operation described above is reversed. More specifically, the camera module 10 rotates axially in a reverse direction and then retracts in the negative Z-direction and is housed in the electronic device 2.

In the present embodiment, when the hollow cylinder 50 is located between the first axial position and the second axial position, the feed screw mechanism including the nut 80 and the threaded portion 61 of the shaft 60 driven by the motor 40 moves the nut 80 in Z-direction. The urging force from the coil spring 70 then moves the camera module 10 in Z-direction together with the hollow cylinder 50. The clutch 90 then engages with the nut 80, restricting the feed screw mechanism from moving the nut 80 in Z-direction. The nut 80 thus rotates together with the shaft 60 as driven by the motor 40 and rotates the clutch 90 and the camera module 10. As described above, the driver 1 according to the present embodiment as a single unit can axially extend and retract and axially rotate the driving target, such as the camera module 10, allowing a smaller device design.

In the present embodiment, when the motor 40 is driven after the hollow cylinder 50 reaches the second axial position, the nut 80 moves upward while the hollow cylinder 50, the clutch 90, and camera module 10 are stationary. The operation thus includes a period of no movement of the camera module 10 between the axial movement and the axial rotation to avoid sudden changes in the motion of components of the driver 1, thus avoiding a device breakdown. The operation may eliminate such a period of no movement and continuously allow the axial movement and the axial rotation of the camera module 10.

In the present embodiment, the coil spring 70 is located between the bottom plate 56 of the hollow cylinder 50 and the bottom of the cylinder 32 in the body 30. The coil spring 70 thus receives a force in the negative Z-direction applied on the hollow cylinder 50. The hollow cylinder 50 does not move axially relative to the camera module 10. Thus, the coil spring 70 absorbs, through the hollow cylinder 50, any force in the negative Z-direction applied on the camera module 10. Thus, the coil spring 70 can absorb any force accidentally applied, for example, to push the camera module 10 extended from the electronic device 2 (as in FIGS. 8B to 8D) into the electronic device 2, thus reducing the impact of such a force on the driver 1 and the electronic device 2.

In the present embodiment, the coil spring 94 is located between the disk 64 on the upper end of the shaft 60 and the upper surface of the clutch 90, and the clutch 90 is movable in Z-direction relative to the camera module 10. Thus, when the camera module 10 is forcibly rotated in the structure having the nut 80 engaged with the clutch 90, the driver 1 is likely to avoid a breakdown. More specifically, when the camera module 10 is forcibly rotated in the structure having the nut 80 engaged with the clutch 90, the clutch 90 moves in the positive Z-direction relative to the nut 80 under the urging force from the coil spring 94. This disengages the upper tabs 85 on the nut 80 from the clutch protrusions 92 on the clutch 90. The clutch 90 then rotates slightly and moves in the negative Z-direction relative to the nut 80 under the urging force from the coil spring 94. Thus, the upper tabs 85 on the nut 80 and the clutch protrusions 92 on the clutch 90 are again engaged together. The nut 80 and the shaft 60 thus avoid receiving a large rotational force and avoid a breakdown of the driver 1.

In the above embodiment, the guide groove 53 is located on the upper end of the hollow cylinder 50, and the engagement portion 13 engaged with the guide groove 53 is located on the camera module 10. In some embodiments, a guide groove (first guide groove) extends circumferentially on the camera module 10 (driving target), and an engagement portion (first engagement portion) engaged with the guide groove is located on the outer periphery of the hollow cylinder 50. In the above embodiment, the guide grooves 33 are located on the cylinder 32 in the body 30 and the protrusions 54 engaged with the guide grooves 33 are located on the hollow cylinder 50. In some embodiments, a guide groove (second guide groove) extends axially on the outer peripheral surface of the hollow cylinder 50 and an engagement portion (second engagement portion) engaged with the guide groove is located on the body 30. In the above embodiment, the guide grooves 91 are located on the outer peripheral surface of the clutch 90, and the rails 15 engaged with the guide grooves 91 are located on the camera module 10. In some embodiments, a guide groove (third guide groove) extends axially on the camera module 10 (driving target), and an engagement portion (third engagement portion) engaged with the guide groove is located on the outer peripheral surface of the clutch 90.

Although the driver 1 in the above embodiment enables both axial movement (extension and retraction) and axial rotation of a driving target such as the camera module 10, the driver 1 may allow either axial movement (extension and retraction) or axial rotation of a driving target.

The terms upper, lower, bottom, and other terms used herein to indicate the positional relationships are used in connection with the illustrated embodiment and are thus changeable depending on the relative positional relationship in the device.

Although the embodiments of the present invention have been described above, the present invention is not limited to the above embodiments and may be modified variously within the scope of its technical idea.

This application claims priority to Japanese Patent Application No. 2017-176902 filed on Sep. 14, 2017, the entire disclosure of which is incorporated herein by reference.

INDUSTRIAL APPLICABILITY

The driver according to one or more embodiments of the present invention is suitably used to drive a driving target incorporated in an electronic device.

What is claimed is:

1. A driver, comprising:
a body;
a shaft extending axially and including a threaded portion;
a motor configured to rotate the shaft;
a hollow cylinder through which the shaft extends, the hollow cylinder being axially movable between a first axial position and a second axial position and being restricted from rotating relative to the body;
a driving target rotatably supported on the hollow cylinder and axially movable with the hollow cylinder;
a first urging member configured to urge the hollow cylinder axially toward the second axial position;
a nut screwed with the threaded portion of the shaft and movable axially while restricting axial movement of the hollow cylinder between the first axial position and the second axial position; and
a clutch engageable with the nut at a position opposite to the first urging member from the nut to restrict axial movement of the nut, the clutch being rotatable with the driving target.

2. The driver according to claim 1, wherein
the nut moves toward the clutch on the shaft with the hollow cylinder being at the second axial position.

3. The driver according to claim 1, wherein
one of the driving target or the hollow cylinder has a first guide groove extending circumferentially, and
another of the driving target or the hollow cylinder includes a first engagement portion engaged with the first guide groove.

4. The driver according to claim 1, wherein
one of the body or the hollow cylinder has a second guide groove extending axially, and
another of the body or the hollow cylinder includes a second engagement portion engaged with the second guide groove.

5. The driver according to claim 1, wherein
one of the clutch or the driving target has a third guide groove extending axially, and
another of the clutch or the driving target includes a third engagement portion engaged with the third guide groove.

6. The driver according to claim 1, wherein
the nut includes a plurality of spring pieces elastically in contact with an inner peripheral surface of the hollow cylinder.

7. The driver according to claim 1, wherein
the hollow cylinder includes a fourth engagement portion protruding toward the nut, and
the nut includes a fifth engagement portion engageable with the fourth engagement portion on the hollow cylinder.

8. The driver according to claim 7, wherein
each of the fourth engagement portion on the hollow cylinder and the fifth engagement portion on the nut has a slope to allow smooth engagement and disengagement of the nut with and from the hollow cylinder.

9. The driver according to claim 1, wherein
the clutch includes a sixth engagement portion protruding toward the nut, and
the nut includes a seventh engagement portion engageable with the sixth engagement portion on the clutch.

10. The driver according to claim 9, wherein
each of the sixth engagement portion on the clutch and the seventh engagement portion on the nut has a slope to allow smooth engagement and disengagement of the nut with and from the clutch.

11. The driver according to claim 9, further comprising:
a second urging member configured to urge the clutch in a direction opposite to the direction in which the first urging member urges the hollow cylinder,
wherein the clutch is movable axially relative to the driving target.

12. The driver according to claim 11, wherein
the second urging member is located between an end of the shaft and the clutch.

13. The driver according to claim 1, wherein
the first urging member is configured to absorb a force axially applied on the driving target.

14. An electronic device, comprising:
the driver according to claim 1.

* * * * *

UNITED STATES PATENT AND TRADEMARK OFFICE
CERTIFICATE OF CORRECTION

| | | |
|---|---|---|
| PATENT NO. | : 11,078,996 B2 | Page 1 of 1 |
| APPLICATION NO. | : 16/647015 | |
| DATED | : August 3, 2021 | |
| INVENTOR(S) | : Yosuke Momose | |

It is certified that error appears in the above-identified patent and that said Letters Patent is hereby corrected as shown below:

On the Title Page

Item (54) and in the Specification Column 1, Lines 1, Change "DRIVE DEVICE AND ELECTRONIC DEVICE" to -- DRIVER AND ELECTRONIC DEVICE --

Signed and Sealed this
Fifth Day of October, 2021

Drew Hirshfeld
*Performing the Functions and Duties of the
Under Secretary of Commerce for Intellectual Property and
Director of the United States Patent and Trademark Office*